Aug. 14, 1928.
L. F. KENNEDY
1,680,739
SYNCHRONIZING DEVICE
Original Filed May 5, 1926
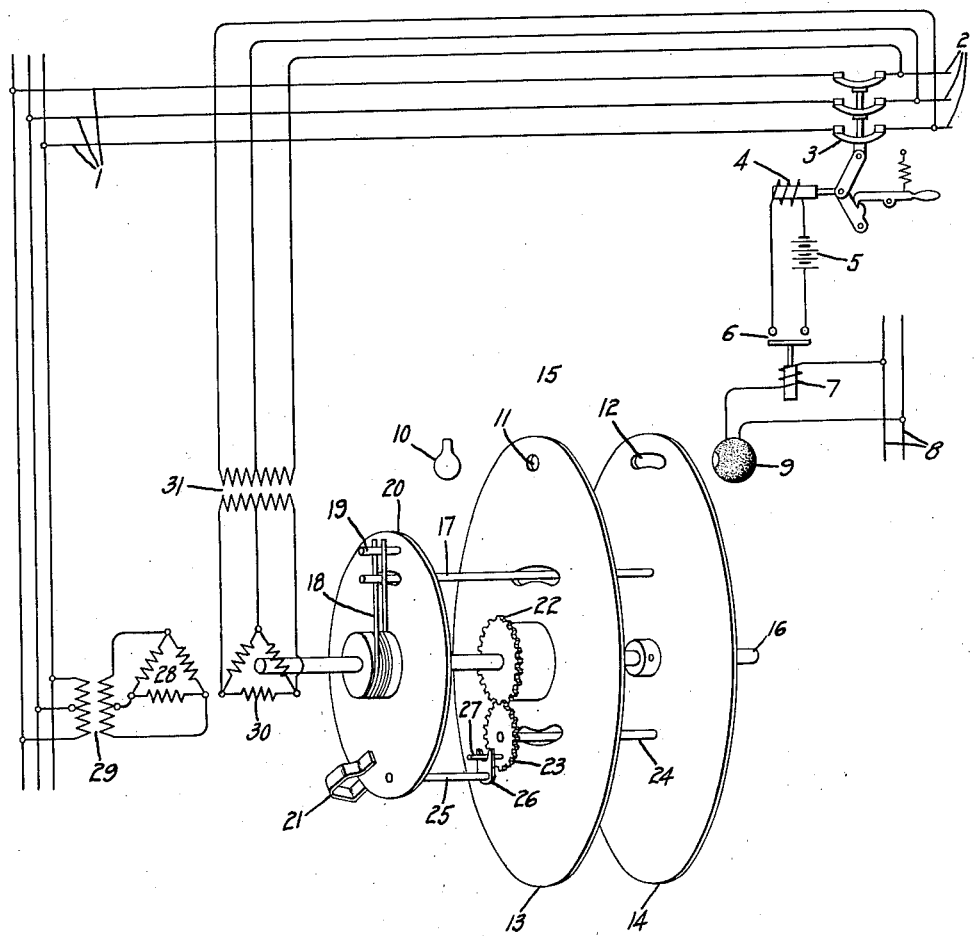
Inventor:
Luke F. Kennedy,
by
His Attorney.

Patented Aug. 14, 1928.

1,680,739

UNITED STATES PATENT OFFICE.

LUKE F. KENNEDY, OF SCHENECTADY, NEW YORK, ASSIGNOR TO GENERAL ELECTRIC COMPANY, A CORPORATION OF NEW YORK.

SYNCHRONIZING DEVICE.

Application filed May 5, 1926, Serial No. 106,995. Renewed April 21, 1928.

My invention relates to synchronizing devices and has for its principal object the provision of an improved method and means for causing two alternating current circuits to be interconnected when they are in phase and operating at substantially the same frequency.

It is desirable that a synchronizing device for controlling the operation of a circuit breaker connected between alternating current circuits be operable both to prevent operation of the circuit breaker until the phase difference between the circuit voltages is brought within certain limits and to cause energization of the circuit breaker control circuit at an instant of time sufficiently in advance of phase coincidence between the circuit voltages to cause the circuit breaker to be closed just as the system voltages are brought into phase with one another.

The time interval between energization of the circuit breaker control circuit and closure of the switch is substantially constant for any given circuit breaker. The rapidity with which the circuit voltages come into synchronism, however, is dependent on the difference between the system frequencies. In order to ensure closure of the circuit breaker at the instant when the system voltages are in phase, I provide a synchronizing mechanism which has no moving electrical contacts and operates in accordance with the difference between the system frequencies to cause energization of the switch operating coil at a time prior to phase coincidence which is just long enough to ensure closure of the circuit breaker when the phases of the circuit coincide.

My invention will be better understood from the following description when considered in connection with the accompanying drawing and its scope will be pointed out in the appended claims.

The drawing illustrates a synchronizing system wherein my invention has been embodied.

This system comprises two alternating current circuits 1 and 2 that are adapted to be interconnected through a switch 3 provided with an operating coil 4 arranged to be supplied with current from a source 5 through a relay switch 6. Operation of the switch 6 is controlled by an operating coil 7 which is connected to a current supply circuit 8 through a light responsive means shown as a photo-electric cell 9. Light for controlling the operation of the cell 9 is supplied from a source 10 through perforations or openings 11 and 12 located near the periphery of rotatable disks 13 and 14 which form a part of a synchronizing mechanism 15.

The disk 14 is fixed to a rotatable shaft 16 and is resiliently coupled through a member 17, a spring 18, and a member 19 to a disk 20 which is free to rotate about the shaft 16 in response to extension or contraction of the coupling formed by the members 17 and 19 and spring 18. A drag magnet 21 is provided for exerting on the disk 20 a retarding force having its magnitude determined by the rotational speed of the disk. The disk 20 is coupled to the disk 13 through a gear 22 fixed to the disk 13, a gear 23 mounted to rotate about a shaft 24 which is fixed to the disk 14, a member 25 fixed to the disk 20 and a contact member 26 fixed to the end of the member 25 and arranged to cooperate with a member 27 which is fixed to the gear 23. With this arrangement, the disk 14 rotates with the shaft 16 and the disks 13 and 20 are rotated about the shaft 16 in opposite directions in response to relative motion between the disks 14 and 20 produced by extension or contraction of the resilient coupling between the disks 14 and 20.

Rotation of the shaft 16 may be effected by any suitable device that is responsive to the phase and frequency relations existing between the electromotive forces of the circuits 1 and 2. This device has been shown as comprising a stator winding 28 connected to the circuit 1 through a transformer 29 and a rotor winding 30 mounted on the shaft 16 and connected to the circuit 2 through a transformer 31. It will be apparent, however, that synchronous motors mechanically interconnected through a differential gear similar to that illustrated in Letters Patent of J. L. Hall, No. 706,554, or other suitable means may be substituted for the windings 28 and 30. In any case the angular position of the disk 20 about the shaft 16 will determine the angular position of the opening 11 about this shaft.

The operation of the synchronizing device 15 will be readily understood if it be assumed that the switch 3 is open and the stator winding 28 has been adjusted about the shaft 16 to aline the light source 10 and the opening 11 with the middle of the slot 12 when the systems are in phase and the spring 18 is contracted. If the circuits 1 and 2 are operating at widely different frequencies, the speeds of the rotating fields produced through windings 28 and 30 are widely different, the shaft 16 is rotated at a comparatively high rate of speed, a comparatively large retarding force is exerted on the disk 20 by the drag magnet 21, the flexible or resilient coupling between the disks 14 and 20 is extended, the perforation 11 is maintained out of alinement with the light source 10, slot 12 and the photo-electric cell 9 and the connection between the current supply means 8 and operating coil 7 is interrupted.

As the frequencies of the circuits 1 and 2 approach equality, the rotational speed of the shaft 16 decreases, a smaller retarding force is exerted on the disk 20 by the drag magnet 21, and the flexible coupling between the disks 14 and 20 contracts and tends to rotate the disks 13 and 20 in opposite directions about the shaft 16 so that the opening 11 is alined with the light source 10, slot 12 and the cell 9 each time the system voltages come into phase with one another. When the system frequencies are sufficiently near equality to permit closure of the switch 3, the opening 11 comes into alinement with the light source 10 and cell 9 at an instant of time preceding phase coincidence between the circuit voltages by a time interval determined by the actual difference between the system frequencies. When this occurs, current is transmitted through the photo-electric cell 9, the operating coils 7 and 4 are successively energized and closure of the switch 3 is produced.

As previously stated, the stator winding 28 is so adjusted about the shaft 16 as to cause the opening 11 to be in alinement with the light source 10 and the cell 9 or center of the slot 12 when the systems are in phase and the spring 18 is contracted. The angular position of the opening 11 about the shaft 16, however, is dependent on the shaft speed and consequently on the difference between the circuit frequencies. This angular adjustment of the opening 11 relative to the cell 9 in accordance with the difference between the circuit frequencies is essential because the time interval between energization of the switch operating coil and closure of the switch is substantially constant, whereas the time required for the opening 11 to move through any given angle into alinement with light source 10 and the cell 9 is dependent on the difference between the system frequencies.

Thus, if the frequencies of the two circuits differ but slightly, the rotational speed of the shaft 16 is comparatively slow, the flexible coupling between disks 14 and 20 tends to contract, the opening 11 is angularly advanced about the shaft 16 and the switch operating coil is energized at an instant of time which precedes phase coincidence of the circuit voltages by an interval of time just long enough to ensure closure of the switch at the instant when the voltages come into phase with one another. If the difference between the frequencies of the voltages becomes greater, however, the rotational speed of the shaft 16 is higher, a greater tensile force is exerted on the spring 18 by the drag magnet, the angular advance of the opening 11 about the shaft 16 is decreased in proportion to the increase in frequency difference, and the switch operating coil is still energized at an instant of time which precedes phase coincidence of the system voltages by a time interval permitting closure of the switch at the proper instant. The synchronizing device 15 thus operates over a range of frequency difference determined by the length of the slot 12 to cause energization of the switch operating coil sufficiently in advance of phase coincidence between the circuit voltages to produce interconnection of the circuits just as they come into phase with one another.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:—

1. The combination of a plurality of alternating current circuits, means for interconnecting said circuits, and means comprising a light responsive device for causing said interconnecting means to be energized at an instant of time preceding phase coincidence in the voltages of said circuits by a time interval which is substantially constant over a predetermined range in the difference between the frequencies of said circuits.

2. A synchronizing device comprising a rotatable shaft, a perforated member fixed to said shaft, a member rotatable about said shaft and coupled to said fixed member through a resilient coupling, and a perforated member rotatable about said shaft in response to relative movement between said coupled members, the arrangement being such that the perforations of said perforated members are alined when said coupling is contracted.

3. A synchronizing device comprising a rotatable shaft, a perforated member fixed to said shaft, a member rotatable about said shaft and coupled to said fixed member through a resilient coupling, a perforated member rotatable about said shaft in response to relative movement between said coupled members, and a light responsive device arranged to be alined with the perforations of said perforated members when said coupling is contracted.

4. A synchronizing device comprising a rotatable shaft, a perforated member fixed to said shaft, a member rotatable about said shaft and coupled to said fixed member through a resilient coupling, a perforated member rotatable about said shaft in response to relative movement between said coupled members, a source of light, and a light responsive device arranged to be alined with said source and the perforations of said perforated members when said coupling is contracted.

5. The combination of a rotatable shaft, a perforated member rotatable about said shaft and coupled to said fixed member through a resilient coupling, means for exerting on said rotatable member a retarding force which is dependent on the rotational speed of said shaft, and a perforated member rotatable about said shaft in response to relative movement produced between said coupled members by said retarding force, the arrangement being such that the perforations of said perforated members are alined when said retarding force is zero.

6. The combination of a plurality of electrical circuits, a rotatable shaft, means for rotating said shaft at a speed proportional to the difference between the frequencies of said circuits, a perforated member fixed to said shaft, a member rotatable about said shaft and coupled to said fixed member through a resilient coupling, and a perforated member rotatable about said shaft in response to relative movement between said coupled members, the arrangement being such that the perforations of said perforated members are alined when the frequencies of said circuits are substantially equal.

7. Synchronizing apparatus comprising a rotatable member adapted to be actuated at a speed dependent on the difference between the frequencies of two electromotive forces and having a light passing means, a movable member having a light passing means, and means for causing relative movement of said members whereby to place said light passing means in predetermined angular positions comprising a disk coupled to said rotatable member and means for retarding the movement of the disk in accordance with the speed of the rotatable member whereby to cause movement of the disk relatively to the member.

8. Sychronizing apparatus comprising a rotatable member adapted to be actuated at a speed dependent on the difference between the frequencies of two electromotive forces and having a light passing means, a movable member having a light passing means, a source of light and means for causing relative movement of said members whereby to aline said light passing means and said light source comprising a disk coupled to said rotatable member and means for retarding the movement of the disk in accordance with the speed of the rotatable member whereby to cause movement of the disk relatively to the rotatable member.

9. Synchronizing apparatus comprising a rotatable member adapted to be actuated at a speed dependent on the difference between the frequencies of two electromotive forces and having a light passing means, a movable member having a light passing means, a source of light and means for causing relative movement of said members whereby to aline said light passing means and said light source comprising a rotatable disk, a flexible coupling between the disk and the rotatable member and means for retarding the movement of the disk in accordance with the speed of the rotatable member whereby to cause movement of the disk relatively to the rotatable member.

10. Synchronizing apparatus comprising a rotatable member having a light passing means and adapted to be actuated at a speed dependent on the difference between the frequencies of two electromotive forces, a movable member having a light passing means, a source of light and means for causing relative movement of said members whereby to aline said light passing means and said light source comprising a disk, a flexible coupling between said disk and said rotatable member and means for retarding the movement of the disk in accordance with the speed of the rotatable member whereby to cause movement of the disk relatively to the rotatable member.

11. Synchronizing apparatus comprising a rotatable member having a light passing means and adapted to be actuated at a speed dependent on the difference between the frequencies of two electromotive forces, a movable member having a light passing means, a source of light on one side of one of said members, a light responsive device on the opposite side of the other member and means for causing relative movement of said members in accordance with the speed of said rotatable member whereby to aline said light passing means with the light source and the light responsive means when the speed is less than a predetermined value.

12. Synchronizing apparatus comprising a rotatable member having a light passing means and adapted to be actuated at a speed dependent on the difference between the frequencies of two electromotive forces, a movable member having a light passing means, a source of light on one side of one of said members, a light responsive device on the opposite side of the other member and means for causing relative movement of said members in accordance with the speed of said rotatable member whereby to aline said light passing means with the light source and the light responsive means when the speed is less than a predetermined value, and circuit controlling means arranged to be controlled by said light responsive means when said light passing means, said source and said light responsive means are in alinement.

In witness whereof I have hereunto set my hand this 4th day of May, 1926.

LUKE F. KENNEDY.